United States Patent [19]

Tward et al.

[11] 4,417,473
[45] Nov. 29, 1983

[54] MULTI-CAPACITOR FLUID LEVEL SENSOR

[75] Inventors: Emanuel Tward, Northridge; Philip D. Junkins, Los Angeles, both of Calif.

[73] Assignee: Tward 2001 Limited, Los Angeles, Calif.

[21] Appl. No.: 345,353

[22] Filed: Feb. 3, 1982

[51] Int. Cl.³ .............................................. G01F 23/26
[52] U.S. Cl. .................................. 73/304 C; 361/284
[58] Field of Search .............. 73/304 C; 361/284, 286, 361/301, 303; 340/563, 618, 631, 620

[56] References Cited

U.S. PATENT DOCUMENTS

| | | | |
|---|---|---|---|
| 2,357,023 | 8/1944 | Reid et al. | 73/304 C |
| 2,581,085 | 1/1952 | Edelman | 73/304 C |
| 2,700,901 | 2/1955 | Rickner | 361/284 |
| 3,193,760 | 7/1965 | Smith | 73/304 C |
| 3,376,746 | 4/1968 | Roberts | 73/304 C |
| 4,083,248 | 4/1978 | Maier | 73/304 C |
| 4,176,553 | 12/1979 | Wood | 361/284 |

Primary Examiner—Charles E. Frankfort
Assistant Examiner—David R. Schuster
Attorney, Agent, or Firm—Philip D. Junkins

[57] ABSTRACT

A tubular shaped fluid level or fluid volume sensor for mounting in a fluid storage vessel for sensing the level or volume of the fluid within the vessel which comprises: a first pair of like electrically conductive capacitor elements each formed to present two electrically connected capacitive plate areas, the capacitor elements being spaced from one another and shaped and arranged to generally define together the outer periphery of the tubular sensor; and a second pair of like electrically conductive capacitor elements each formed to present two electrically connected capacitive plate areas, the second pair of capacitor elements being positioned within and spaced from the first pair of capacitor elements and being spaced from one another and shaped and arranged to generally define together the inner periphery of the tubular sensor. Electrical insulating material located between the capacitor elements defining the other periphery of the sensor and the capaictor elements defining the inner periphery of the sensor for mounting the pairs of capacitor elements in fixed spaced relationship from one another and for positioning the elements so that each capacitive plate area thereof defines with a capacitive plate area of the next adjacent capacitor element a dielectric space therebetween so that the mounted capacitor elements together form four like dielectric spaces. Material of known constant dielectric value fills two of the dielectric spaces thereby forming with their respective space defining capacitive plate areas two capacitors of known fixed and substantially like capacitive value. The remaining two dielectric spaces are open to receive varying levels of fluid thereby forming with their respective capacitive plate areas, and the fluid within the spaces, two capacitors of variable capacitive value.

10 Claims, 7 Drawing Figures

MULTI-CAPACITOR FLUID LEVEL SENSOR

CROSS REFERENCE TO RELATED APPLICATION

The present invention is related to commonly assigned U.S. Patent application Ser. No. 345,350 filed Feb. 3, 1982, entitled METHOD OF MEASURING AND INDICATING FLUID LEVELS.

BACKGROUND OF THE INVENTION

1. Field of the Invention

The present invention is related to systems for measuring and indicating the level and/or quantity of fluid in a container or storage tank and is particularly applicable to the problem of accurately measuring the level or amount of fuel in vehicular fuel tanks including fuel tanks used in aircraft, watercraft and landcraft. In a more directive sense, the invention relates to fluid level or fluid quantity measuring and indicating systems which include a capacitive type immersion sensor or probe.

2. Description of the Prior Art

Many techniques have been developed to measure the liquid levels and liquid quantities in storage tanks. The most common system for measuring the fuel level in the fuel tank of a motor vehicle employs a variable resistor within the tank. The wiper arm of the variable resistor is connected through a pivot to a float which monitors the upper level of the fuel in the tank. When the vehicle is traveling on a grade, the fuel surface level is shifted at an angle to its normal horizontal reference plane within the fuel tank and causes the float to monitor an erroneous level, either higher or lower than the correct level, a phenomenon termed "fuel level shift." Additionally, when the vehicle starts, accelerates, slows or stops its motion, waves are generated in the stored fuel. This phenomenon is commonly referred to as "sloshing" and causes the float to bounce up and down, thereby affecting the fuel measurement readings. Mechanical and electrical damping techniques have been employed to reduce the effects of fuel level shift and sloshing, but they have not been shown to be suitable for obtaining instantaneous and accurate fuel level measurements. The adverse affects of fuel level shift and sloshing are even more troublesome in the fuel tanks of aircraft and high speed landcraft and watercraft.

To overcome the problems of fuel level shift and sloshing in fuel level measuring and indicating, a number of systems have been proposed which use immersion condenser units or probes in liquid containers or tanks in combination with suitable electrical circuitry and measuring and indicating instrumentation. In U.S. Pat. No. 2,357,023, granted to O. W. Reid et al and entitled "Liquid Level Measuring Apparatus," the inventors disclose the use of a plate type immersion condenser unit located in a liquid container and for which the liquid itself forms the dielectric between the plates. The capacitive value of the immersion condenser is variable and changes with respect to the level of liquid in the container. By constructing the condenser unit of multiple pairs of plates which are placed in different areas of the container the effects of liquid sloshing or surging and liquid level shift are reduced so as to obtain a more accurate capacitance value for the immersion unit. The immersion condenser unit (whether of single pair or multiple pair plate design) is electrically connected into an alternating current bridge circuit having two condensers of fixed and equal capacity each forming an arm of the bridge, the remaining two arms of the bridge being made up of a variable capacity condenser and the immersion condenser. The bridge circuit (of well known Wheatstone configuration) is connected to a source of alternating current of predetermined frequency and detector and measurement indicating circuitry. The bridge circuitry is arranged to be in an unbalanced state so long as any liquid remains in the container in the dielectric space between the plates of the immersion condenser unit.

U.S. Pat. No. Re. 23,493, granted to A. Edelman and entitled "Liquid Level Gauge" also discloses liquid level detection and measurement indicating circuitry incorporating a plate type immersion condenser unit. This unit, termed a "measuring condenser," has a capacitive value which changes with respect to the level of liquid in a container or tank. The circuitry also includes a "comparison condenser" unit of plate type design which is always maintained fully immersed in the liquid to be measured as to its level or volume. The comparison condenser with respect to different liquids (having different dielectric values) is variable in its capacitance value but with respect to the measuring condenser, and its sensing of various levels of like liquid, provides a compensating or comparison capacitive value to the circuitry so that measurement of a liquid level is independent of the dielectric constant of the liquid and any variation thereof. Both the measuring condenser unit and the comparison condenser unit are exposed to substantially the same ambient conditions as the liquid being measured. In U.S. Pat. No. 4,194,395, granted to T. J. Wood and entitled "Capacitive Liquid Level Sensor," a capacitive type sensor for measuring liquid levels is proposed in which a plurality of like plate type capacitors are aligned in parallel. The dielectric spaces of each capacitor (isolated from each other) receive the liquid to be measured which (with air, if any, above the liquid) establishes the dielectric for the spaces and thus the capacitance value of each capacitor. Since the capacitors are identically configured they exhibit equal values of capacitance only when the liquid dielectric (and air, if any) between the plates of each capacitor covers equal areas. When the liquid within a container is being measured as to its height level or volume and is sloshing or has its level disoriented with respect to its normal liquid level reference plane, the liquid (functioning as a dielectric) covers different areas of the capacitors and they exhibit dissimilar values of capacitance. Associated circuitry interrogates the capacitors and at points when the capacitance values approach equality the system reads one of the values and registers the liquid level or quantity of liquid remaining in the container.

SUMMARY OF THE INVENTION

Prior art capacitive liquid level sensors and associated interrogating, balancing, interpreting and measurement indicating circuitry are complex and deficient in their approaches to solving the problems of liquid sloshing and liquid level shift and the effects on liquid level and volume measurement of changes in the physical and chemical characteristics of the liquid being measured and of the multiple characteristics of the environment of the liquid and its container. The present invention addresses the complexities of the prior art and provides fluid level or volume measurements with a high degree of accuracy through a unique capacitive sensor or probe of multi-capacitor design and simplified associated circuitry which is insensitive to environmental changes and stray capacitances.

It is an object of the present invention to provide an improved capacitive type sensor applicable to liquid level or volume measurement in both stationary and vehicular liquid storage containers and tanks.

It is another object of the present invention to provide a capacitive type liquid level sensor of multi-capacitor design that accurately detects and measures liquid levels or volumes in liquid storage tanks when the liquid therein is sloshing and/or misoriented with respect to its normal surface plane of reference.

A still further object of the present invention is to provide a capacitive type fluid level sensor of multi-capacitor design that is relatively insensitive in its accuracy of measurement to changes in the environmental characteristics of such fluid and its container.

Another object of the present invention is to provide a capacitive type fluid level sensor of multi-capacitor design in association with a simple alternating current bridge circuit, including detector and direct readout circuitry, which is insensitive to changes in the environmental characteristics of such fluid and its container, to fluid motion and misorientation of the container, or to stray capacitance in the sensor-bridge system.

The present invention is intended as an improvement to conventional fluid level or volume measurement systems and is broadly suitable for use in all types of fluid storage containers and tanks and for use with respect to fluid level or volume measurement of conducting as well as non-conducting fluids. The system is also applicable to level and volume measurement of conducting and non-conducting fluids which are comprised, at least in part, of a liquid material. The invention is a unique modification of the capacitive sensor disclosed and claimed in commonly assigned U.S. Patent application Ser. No. 34,535 filed Feb. 3, 1982, entitled FLUID LEVEL SENSOR.

It is to be noted and understood that, throughout this specification and the appended claims, the term or word "fluid" shall and does mean a uni-component or multi-component substance or composition which tends to flow or tends to conform to the shape or configuration of its container and which may exhibit electrically non-conducting or electrically conducting characteristics. Thus, the term "fluid" encompasses (without limitation) a wide variety of: liquids, gases, powdered or granulated solids, liquid/liquid mixtures or emulsions, liquid/gas mixtures or dispersions, liquid/solid mixtures, and gas/solid mixtures. In further definition of the term "fluid," it is to be understood that multi-component substances comprising a fluid must exhibit for each component a different and determinable dielectric value. Thus, for multi-component fluids or fluids comprised of different phases of the same substance, measurable differences must be exhibited with respect to the dielectric constants for such components or phases.

For purposes of ease of description of the invention and its application to fluid level and fluid quantity measurement, the sensor design comprising the invention will, for the most part, be discussed in terms of its applicability to liquid level or liquid volume measurement.

The invention includes a uniquely configured tubular capacitive sensor or measurement probe structure which extends from the top or high point of a fluid storage tank, in its usual orientation, to the bottom or low point of such tank in such orientation. The capacitive sensor is comprised of four plate type capacitors extending in clustered parallel alignment throughout the length of the sensor so that each capacitor is in contact with the stored fluid throughout the range of levels to be monitored and all capacitors are exposed to the same fluid, atmospheric and container environment. The four capacitors are constructed from four electrically conductive capacitor elements each comprised of two electrically connected capacitive plate areas. Two of the capacitor elements are shaped to generally define together the outer periphery of the tubular sensor. The remaining two capacitor elements are shaped to generally define together the inner periphery of the sensor. The capacitor elements of the sensor are mounted in fixed spaced relationship from one another and positioned by the mounting means so that each plate area of each capacitor element defines with a plate area of the next adjacent capacitor element a dielectric space therebetween whereby the mounted capacitor elements together form four dielectric spaces. Material of constant dielectric value fills two of the dielectric spaces thereby forming with the respective space defining plates a pair of capacitors of fixed capacitive value. The other two dielectric spaces remain open to receive variable quantities of the fluid to be sensed and the plates defining such spaces with the variable quantities of fluid therein cooperate to form a pair of variable capacitors.

In the preferred structure of the multi-capacitor sensor of the present invention, the two fixed value capacitors are of equal capacitance value and are identically constructed and configured with respect to each other so that they respond in like fashion to the environment of the fluid being measured and its container. The two variable value capacitors are likewise identically constructed and configured with respect to each other so that they too respond in like fashion to the environment of the fluid and its container. Since the two variable value capacitors are identically configured they exhibit equal values of capacitance only when the fluid (having its specific dielectric value) between the plates of each capacitor fills equal spaces and covers equal areas. As a corollary, when the fluid within the container is sloshing or has its level disoriented with respect to its normal plane of repose in the container, the fluid functioning as a dielectric in the two variable capacitors will fill different space volumes and cover different areas of such capacitors and they will exhibit dissimilar values of capacitance.

The unique structure of the capacitive sensor, as described in detail hereinafter, permits the pair of fixed value capacitors (having like capacitive value) and the pair of variable value capacitors to be directly utilized as the four capacitive legs or sides of a classic alternating current Wheatstone bridge circuit having an alternating current generator (constant voltage at set frequency) and associated current detection, measurement and value indicating instrument circuitry. The bridge circuitry, comprised of the two fixed capacitors and two variable capacitors forming the sensor, is arranged to be in an unbalanced state (current flowing through the detection circuit) so long as any liquid remains in the container in the dielectric spaces between the plates of the variable capacitors. With the bridge structured and operating in this fashion the detector circuitry reads the bridge unbalance (value of current flow) linearly as a direct measurement of fluid level or volume of fluid in the container within which the sensor is placed. Because all capacitors of the bridge circuit are part of and comprise the multi-capacitor sensor in the system, the bridge circuit is insensitive to stray capacitance and such bridge circuit capacitor components are all subjected to like environmental conditions.

The two variable capacitors of the sensor unit are directly affected in their capacitance values by the fluid levels therein at close but separate locations and the associated detection circuitry may be designed to interrogate these sensor capacitors to derive an output characteristic value at the instants at which the fluid levels within such capacitors are equal (capacitive values then are equal). At such instances the unbalanced state of bridge (value of current flow) is measured and the value indicating circuitry reports (visual and/or recorded) the exact fluid level or volume value in direct linear relationship to the current value. Thus, the unique sensor or probe of this invention monitors and measures fluid levels and of this invention monitors and measures fluid levels and volumes with extraordinary accuracy and communicates such measurements through simple alternating current bridge and associated circuitry for indicating and/or recording in direct digital readout display or analog display, and/or printed fashion or as an electrical signal for control or other purposes. The system circuitry may be designed to hold the preceeding level or quantity measurement until the generation of a new level or quantity value reading is made.

DESCRIPTION OF THE PREFERRED EMBODIMENTS

Figure 1:
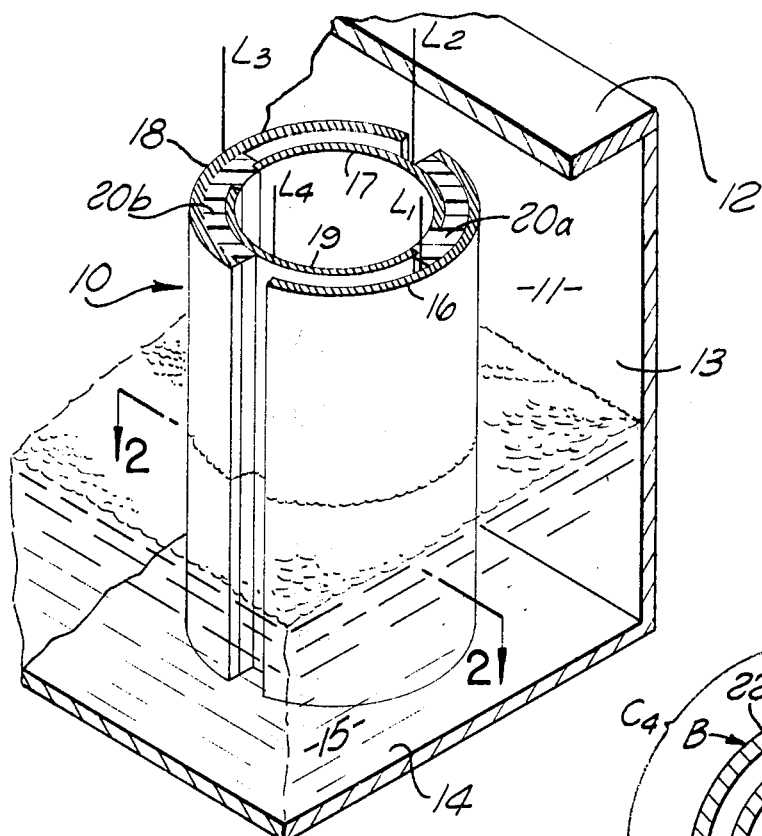
FIG. 1 is a cut-away view of a liquid storage tank in which a multi-capacitor fluid level sensor of the present invention is mounted.

A multi-capacitor liquid level sensor 10, in accordance with the present invention, is illustrated in FIG. 1 in installed position within a liquid storage tank 11 (having a top wall 12, side wall 13 and bottom wall 14) containing a quantity of liquid 15. As shown, the sensor 10 extends from the bottom of the tank to the top and is generally oriented so that the vertical axis of the sensor is normal to the surface plane of the liquid in its static condition. For other and more complex tank configurations the sensor need not be mounted in vertical orientation with respect to the surface plane of static fluid so long as the sensor spans the full range of fluid levels experienced within the tank.

Figure 2:
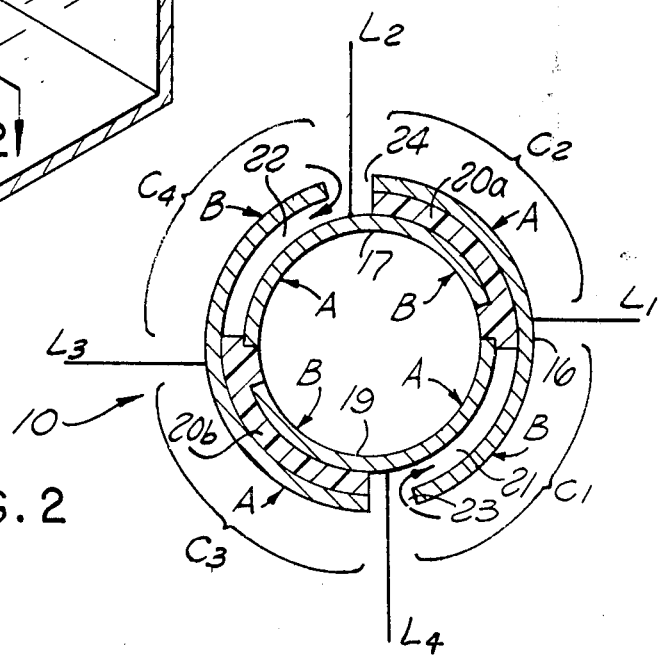
FIG. 2 is a cross-sectional view of the tubular sensor shown in FIG. 1.

The liquid level sensor 10 of FIG. 1 (shown in cross-sectional view in FIG. 2) is comprised of four electrically conductive capacitor elements 16, 17, 18, and 19 each comprised of two capacitive plate areas "A" and "B". Nonconductive elements 20a and 20b are provided for mounting the capacitor elements in fixed spaced relationship from one another and for positioning such elements so that each plate area thereof defines with a plate of the next adjacent capacitor element a dielectric space therebetween whereby the four mounted capacitor elements together form four dielectric spaces. As shown in FIGS. 1 and 2 the non-conductive mounting element 20a extends between plate area A of element 16 and plate area B of element 17 and the non-conducting mounting element 20b extends between plate area A of element 18 and plate area B of element 19 and these mounting elements fill the dielectric spaces between their respective pairs of plate areas. Thus, non-conductive mounting element 20a, comprised of a sheet of dielectric material, forms with conductive plate area A of the element 16 and conductive plate area B of element 17 plate-type capacitor $C_2$ of fixed capacitance (impedance) value and non-conductive mounting element 20b, comprised of a like sheet of dielectric material, forms with conductive plate area A of element 18 and conductive plate area B of element 19 plate-type capacitor $C_3$ of like fixed capacitance (impedance) value.

The dielectric spaces 21 and 22, defined (respectively) by plate area B of element 16 and plate area A of element 19 and plate area B of element 18 and plate area A of element 17 remain open and free to receive variable quantities and levels of the liquid to be sensed together with vapors above such levels. Thus, the variable liquid-vapor quantities within spaces 21 and 22 form with conductive plate area B of element 16 and conductive plate area A of element 19 and conductive plate area B of element 18 and conductive plate area A of element 17 two plate-type capacitors $C_1$ and $C_4$ of variable capacitance (impedance) value.

Figure 3:
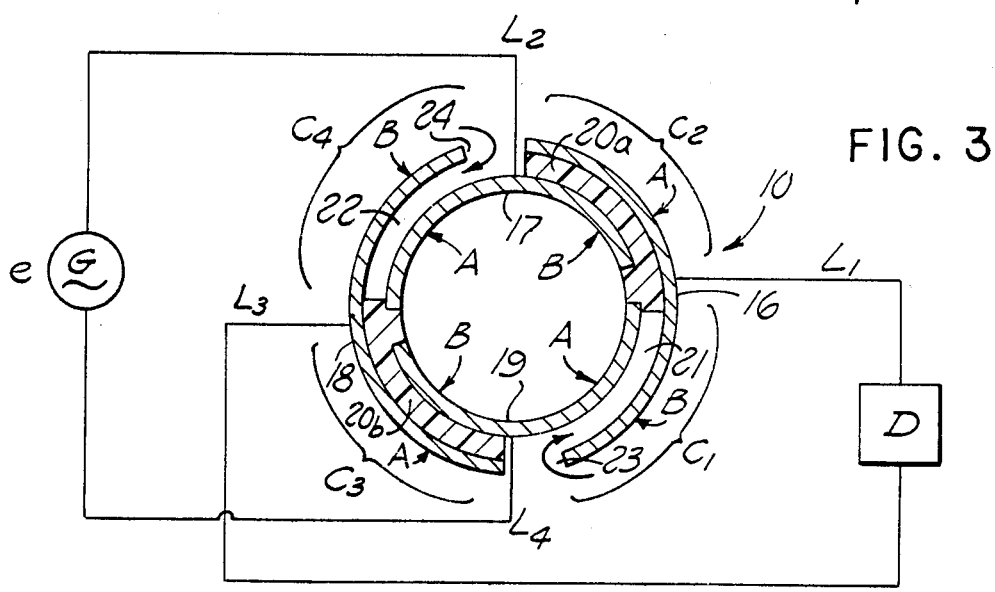
FIG. 3 is an electrical diagram of the bridge circuitry, including the multi-capacitor probe of FIG. 1, employed in the fluid level and volume measuring system of the present invention.

The multi-capacitor sensor 10 is insulated from the tank by any well known means. Electrically conductive lead wires $L_1$, $L_2$, $L_3$ and $L_4$ are connected, respectively, to capacitor elements 16, 17 18 and 19 and leave the tank 11 via insulated passage therefrom. When these lead wires are further connected to alternating current generator circuitry "e" and detection, measurement and value indicating circuitry "D", as shown in FIG. 3, there results simple bridge circuitry of classic Wheatstone configuration as shown schematically in FIG. 4.

The alternating current generator circuitry e is connected to the bridge circuitry (the capacitors $C_1$, $C_2$, $C_3$ and $C_4$ of the sensor 10) through screened input lead wires $L_2$ and $L_4$. Outlet wires (screened) $L_1$ and $L_3$ connect the bridge circuitry to the detector circuitry D (including appropriate current rectifier circuitry, if required), bridge signal interrogation circuitry, current measurement circuitry and current value indicating circuitry. The bridge signal interrogation circuitry may be designed to respond only to instances when the capacitance values of the variable value capacitors $C_1$ and $C_3$ of the sensor are euqal (instances when these capacitors contain equal fluid levels). At such instances the current measurement circuitry determines the output current value of the bridge and the current value indicating circuitry translates such output value into a readout volumetric or fluid level value or recorded volumetric or fluid level value. Alternatively, the frequency or voltage of the applied alternating current may be varied until the detector circuitry (including its measuring and/or value indicating instrumentation) is set at a predetermined point, the liquid volume being then read off directly or recorded in gallons, liters or other volumetric units by sensing the varied frequency (or its period) or voltage, respectively.

Figure 4:
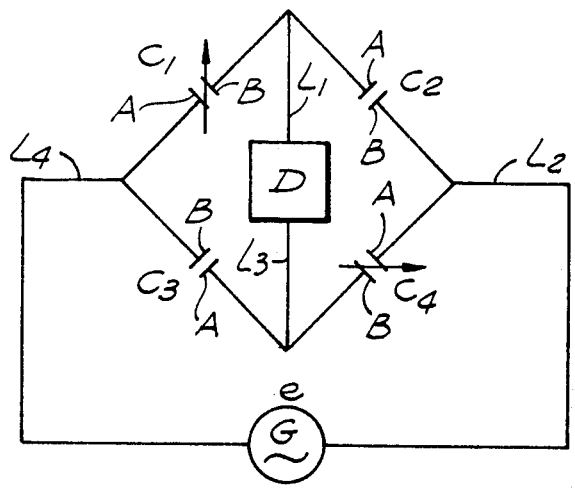
FIG. 4 is a schematic/block diagram of the circuitry of FIG. 3 in which the capacitors of the sensor are more clearly identified in a classic Wheatstone bridge circuit configuration.

For the bridge circuit of FIG. 4 the respective capacitors may have impedance values as indicated below:
Fixed value capacitors
$C_2$ impedance = $Z_2$
$C_3$ impedance = $Z_3$
Variable value capacitors
$C_1$ impedance = $Z_1$
$C_4$ impedance = $Z_4$ The detector circuitry D also presents an impedance value which may be designated as $Z_5$. The alternating current generator circuitry, at set frequency, has a constant voltage "e" which is applied across the bridge. Thus, If $Z_2 = Z_3$ and $Z_1 = Z_4$, and If $Z_5$ is of small value, i.e., $Z_5 < Z_1$ and $Z_2$ then it can be established that the current "i" through the detector circuitry is:

$$i = \frac{ew}{2} \times (C_1 - C_2)$$

where
e is the voltage value and
w = $2\pi x$ frequency

The current value i in the detector circuitry changes in linear relation to changes in the capacitance value of capacitor $C_1$. Therefore, changes in the $C_1-C_2$ relationship may be determined by measuring changes in the current value i. Furthermore, with appropriate detector and a.c. generator circuitry (e.g. by keeping the current i constant and varying the w value) the readout of the $C_1-C_2$ value can be effected by measuring the period of the angular frequency w. Thus, the readout instrumentation in the detector circuitry may yield digital values in direct linear relationship to the actual liquid volume values within the tank or container wherein the sensor of this invention is mounted.

It should be understood, that the multi-capacitor fluid level sensor of the present invention is not limited to use with non-conducting fluids. It is equally practical to make fluid level or volume measurements on conducting fluids, provided that the capacitive plates of the electrically conductive capacitor elements of the sensor are coated with an insulating film thereby preventing the passage of shorting components of current between such plates via the conducting fluids.

Figure 5:
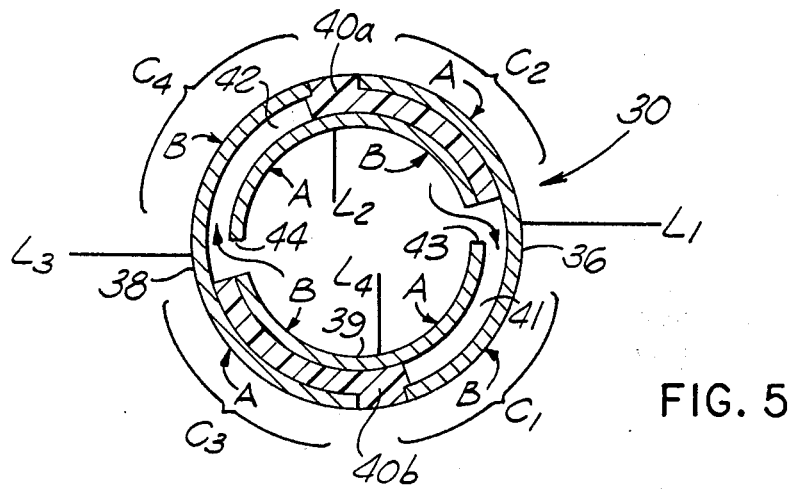
FIG. 5 is a cross-sectional view of an alternative form of the fluid level sensor of FIG. 2.

An alternative cross-sectional configuration of the tubular multicapacitor sensor of FIG. 2 of the present invention is shown in FIG. 5 wherein the sensor 30 is of generally tubular design and is formed of two like outer arc-shaped electrically conductive capacitor elements 36 and 38 and two like inner arc-shaped electrically conductive capacitor elements 37 and 39. The outer capacitor elements 36 and 38 and the inner capacitor elements 37 and 38 are mounted in fixed spaced relationship by like non-conductive elements 40a and 40b. Each of the arc-shaped electrically conductive capacitor elements is comprised of two capacitive plate areas "A" and "B" and the four mounted capacitor elements together form four dielectric spaces. Non-conductive element 40a fills the dielectric space between plate area A of element 36 and plate area B of element 37 forming fixed value capacitor $C_2$. Non-conductive element 40b fills the dielectric space between plate area A of element 38 and plate area B of element 39 forming fixed value capacitor $C_3$. Plate type capacitors $C_2$ and $C_3$ are of like fixed capacitance (impedance) value.

In sensor 30 (FIG. 5), the dielectric spaces 41 and 42, defined (respectively) by plate area B of element 36 and plate area A of element 39 and plate area B of element 38 and plate area A of element 37, remain open and free to receive variable quantities and levels of the liquid to be sensed together with vapors above such levels. Thus, the variable liquid-vapor quantities within spaces 41 and 42 form with conductive plate area B of element 36 and conductive plate area A of element 39 and conductive plate area B of element 38 and conductive plate area A of element 37 two plate-type capacitors $C_1$ and $C_4$ of variable capacitance (impedance) value. The liquid being sensed as to level or volume enters dielectric spaces 41 and 42 of the sensor 30 through elongated ports 43 and 44 located on the interior surface of the sensor. With such an arrangement the sensor 30 itself may comprise a vessel or container for fluids, the level or volume of which needs or requires measuring.

Figure 6:
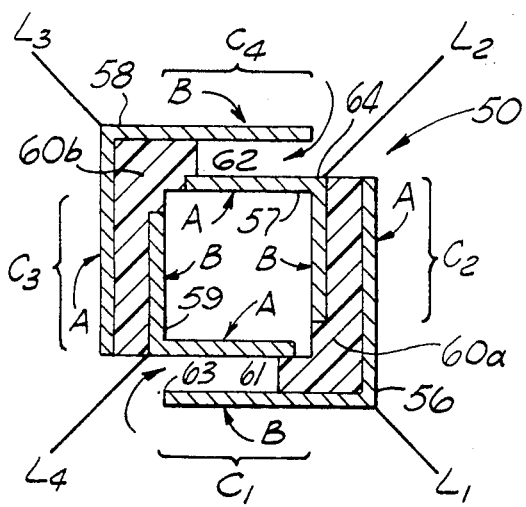
FIG. 6 is a cross-sectional view of another form of the tubular sensor of the present invention.
Figure 7:
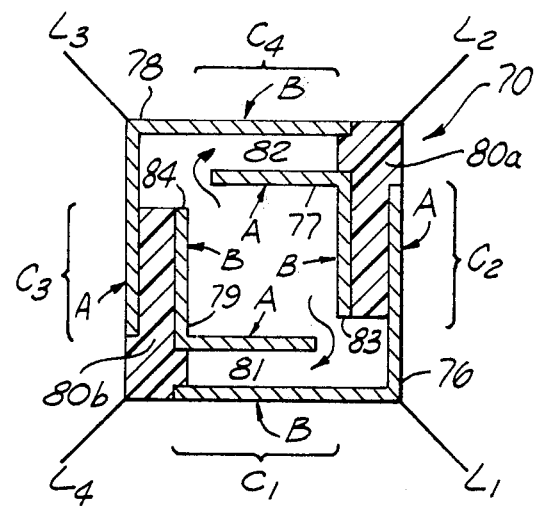
FIG. 7 is a cross-sectional view of an alternative form of the sensor of FIG. 6.

A modified form of the tubular sensor 30 of FIG. 5 is illustrated in FIG. 6. In FIG. 6 the sensor unit 50 is of generally tubular design and is formed of two like outer angle-shaped electrically conductive capacitor elements 56 and 58 and two like inner angle-shaped electrically conductive capacitor elements 57 and 79. The outer and inner capacitor elements are mounted in fixed spaced relationship by like non-conductive elements 60a and 60b. The placement of the non-conductive elements maintains the same fixed value and variable value condenser arrangement in sensor 50 of FIG. 6 with respect to sensor 30 of FIG. 5, but the elongated ports 63 and 64 (through which the liquid being sensed enters respectively, dielectric spaces 61 and 62) are located on the external surface of the tubular sensor structure rather than on the inside of the sensor structure 30 of FIG. 5. An alternative configuration of rectangular-shaped tubular sensor is shown in FIG. 7. The sensor 70 of FIG. 7 is comprised of angle-shaped capacitor elements 76, 77, 78 and 79 of the type illustrated in sensor 50 of FIG. 6 but the dielectric spaces 81 and 82 of sensor 70 receive fluid through elongated ports 83 and 84 located on the interior surface of the sensor as illustrated in sensor 30 of FIG. 5.

The unique multi-capacitor sensor of the present invention also is not limited to level or volume measurements of liquids in tanks or storage containers, but may be used (for example) in the level or volumetric measurement of powdered and granular materials in tanks, containers, hoppers and the like. Broadly, the sensor may be used for volume measurement with respect to a wide variety of multi-conponent systems (liquid/liquid, liquid/gas, liquid/solid, solid/gas, etc.) as long as the dielectric constants for the two or more components are different. It must be understood that in all level or volumetric measurement uses of the sensor a multi-component system (at least two materials) is involved over the measurement range. Thus, in the case of a simple fuel tank only at two measured instances is a single component sensed, i.e., when the tank is absolutely filled with fuel of known dielectric value with no air present and when the tank is absolutely empty of fuel with only air present and when the tank is absolutely empty of fuel with only air present with its known dielectric value. All other sensed instances involve the measurements of the dielectric value of a multi-component system, i.e., the fuel and air. The only requirement for applicability of the sensor for depth or volumetric measurement of a multi-component system is that the two dielectric spaces of the variable value capacitors of the sensor be exposed to the system over the entire range of component variety or change for which measurement is desired.

Powdered and granular materials in containers had hoppers, as mentioned above, also present a multi-component system, the depth or volume of which can be measured by the sensor of this invention. Such materials have a determinable dielectric value in their normal state of gravity packed repose. Thus as a stored material or hopper fed material, volume or depth measurements can be made with the sensor for a two-component system comprised of the material and air. Further, the volume of such solid materials in a fluidized state (solid/gas mixture) can be ascertained by the sensor.

In a more complex application of the sensor the volume of liquids in a gas can be measured and reported. Thus, with proper calibration of the "full" and "empty" settings of the detector circuitry of the bridge circuit associated with a sensor (with insulating coating on capacitor plates) mounted in a water storage tank, the volume of water in the tank can be accurately measured even though the water therein is subjected to zero gravity and is suspended as micro-droplets in the air (liquid/gas mixture) within the tank. The sensor measures the combined dielectric value of the dispersion of water droplets and air.

Numerous other examples of multi-component systems can be suggested for which depth and/or volume measurements can be made and reported via the multi-capacitor sensor of the present invention and the simple Wheatstone bridge circuitry associated therewith. The sensor system is insensitive to stray capacitances because it contains all of the fixed and variable capacitors comprising the bridge circuitry and all of such capacitors are subject to the same multi-component system and container environment. Further, the sensor system may be applied to material level, depth and volume measurement situations in which the material container is subjected to misorientation and the material within the continer is subjected to sloshing or other unnatural environmental conditions such as low or high temperatures or zero gravity.

While the invention has been described in detail with respect to a number of preferred embodiments, it will be understood by those skilled in the art that various changes and modifications may be made without departing from the spirit and scope of the novel concept of this invention. Therefore, it is intended by the appended claim to cover all such modifications and variations which fall within the true spirit and scope of the invention.

What is claimed is:

1. A tubular shaped capacitive type fluid level sensor for mounting in a fluid storage vessel for sensing the level of the fluid within said vessel over a predetermined height range comprising:
   (a) a first pair of electrically conductive capacitor elements each formed to present two electrically connected capacitive plate areas, said first pair of capacitor elements and their respective plate areas having a length at least equal to said height range and shaped to generaly define together the outer periphery of said tubular sensor;
   (b) a second pair of electrically conductive capacitor elements each formed to present two electrically connected capacitive plate areas, said second pair of capacitor elements and their respective plate areas having a length at least equal to said height range and shaped to generally define together the inner periphery of said tubular sensor;
   (c) means forned of electrically insulating material located between the capacitor elements defining the outer periphery of said sensor and the capacitor elements defining the inner periphery of said sensor for mounting said capacitor elements in fixed spaced relationship from one another and for positioning said elements so that each capacitive plate area thereof defines with a capacitive plate area of the next adjacent capacitor element a dielectric space therebetween whereby said mounted capacitor elements together form four like dielectric spaces; and
   (d) material of known constant dielectric value within two of the dielectric spaces thereby forming with their respective space defining capacitive plate areas two capacitors of fixed electrical capacitive value, the remaining two dielectric spaces being open to receive varying levels of fluid thereby forming with their respective capacitive plate areas and fluid within said spaces two capacitors of variable capacitive value.

2. A tubular shaped capacitive type fluid level sensor as defined in claim 1 wherein the two capacitors of known fixed electrical capacitive value have substantially like capacitive value.

3. A tubular shaped capacitive type fluid level sensor as defined in claim 1 wherein the means for mounting the electrically conductive capacitor elements in fixed spaced relationship extends into two of the dielectric spaces as the material of constant dielectric value forming with the space defining capacitive plate areas of said spaces the two capacitors of fixed capacitive value.

4. A tubular shaped capacitive type fluid level sensor as defined in claim 1 wherein the first pair of electrically conductive capacitor elements and the second pair of electrically conductive capacitor elements forming said four like dielectric spaces are positioned so that said spaces are aligned as two diametrically opposed space pairs and the material of dielectric constant value within two of said spaces is within the spaces forming one of said space pairs.

5. A tubular shaped capacitive type fluid level sensor as defined in claim 1 wherein the first pair of electrically conductive capacitor elements are of semi-circular shape and define together an outer periphery of said sensor which is circular and the second pair of electrically conductive capacitor elements are of semi-circular shape, but of smaller circular radius, and define together an inner periphery of said sensor which is circular.

6. A tubular shaped capacitive type fluid level sensor as defined in claim 5 wherein the material of constant dielectric value within two of the dielectric spaces extends across and closes the spaces between the inner semi-circular shaped capacitor elements whereby the two open dielectric spaces are free to receive varying levels of fluid only from without the sensor through openings to said spaces between the outer semi-circular shaped capacitor elements.

7. A tubular shaped capacitive type fluid level sensor as defined in claim 5 wherein the material of constant dielectric value within two of the dielectric spaces extends across and closes the spaces between the outer semi-circular shaped capacitor elements whereby the two open dielectric spaces are free to receive varying levels of fluid only from within the sensor through openings to said spaces between the inner semi-circular shaped capacitor elements.

8. A tubular shaped capacitive type fluid level sensor as defined in claim 1 wherein the first pair of electrically conductive capacitor elements are of 90° angular shape and define together an outer periphery of said sensor which is rectangular and the second pair of electrically conductive capacitor elements are of 90° angular shape, but of smaller dimension, and define together an inner periphery of said sensor which is rectangular.

9. A tubular capacitive type fluid level sensor as defined in claim 8 wherein the material of constant dielectric value within two of the dielectric spaces extends across and closes the spaces between the inner angular shaped capacitor elements whereby the two open dielectric spaces are free to receive varying levels of fluid only from without the sensor through openings to said spaces between the outer angular shaped capacitor elements.

10. A tubular capacitive type fluid level sensor as defined in claim 8 wherein the material of constant dielectric value within two of the dielectric spaces extends across and closes the spaces between the outer angular shaped capacitor elements whereby the two open dielectric spaces are free to receive varying levels of fluid only from within the sensor through openings to said spaces between the inner angular shaped capacitor elements.

* * * * *